United States Patent [19]

Akao et al.

[11] 4,356,224
[45] Oct. 26, 1982

[54] WRAPPING MATERIAL FOR PHOTOGRAPHIC LIGHT-SENSITIVE MATERIAL

[75] Inventors: Mutsuo Akao; Tadashi Kawata, both of Minami-ashigara, Japan

[73] Assignee: Fuji Photo Film Co., Ltd., Kanagawa, Japan

[21] Appl. No.: 155,290

[22] Filed: Jun. 2, 1980

[30] Foreign Application Priority Data

Jun. 1, 1979 [JP] Japan .................................. 54-68379

[51] Int. Cl.³ .......................... B32B 7/02; B32B 5/16
[52] U.S. Cl. .................................... 428/220; 206/455; 229/3.5 R; 428/327; 428/328; 428/338; 428/402
[58] Field of Search .................... 229/3.5 R, 40, 87 R; 206/455; 428/220, 328, 329, 342, 215, 338, 402, 327

[56] References Cited

U.S. PATENT DOCUMENTS

| | | | |
|---|---|---|---|
| 3,956,223 | 5/1976 | Chiang et al. | 428/346 |
| 4,147,291 | 4/1979 | Akao et al. | 206/455 |
| 4,233,195 | 11/1980 | Mills | 428/464 |
| 4,258,100 | 3/1981 | Fujitani et al. | 428/328 |

*Primary Examiner*—William J. Van Balen
*Attorney, Agent, or Firm*—Sughrue, Mion, Zinn, Macpeak & Seas

[57] ABSTRACT

Material for use in wrapping photographic light-sensitive material is described, including a resin layer comprising a thermoplastic resin having an aluminum paste or powder dispersed therein; this material has desirable characteristics for such a wrapping material and can be economically produced.

12 Claims, 17 Drawing Figures

WRAPPING MATERIAL FOR PHOTOGRAPHIC LIGHT-SENSITIVE MATERIAL

BACKGROUND OF THE INVENTION

1. Field of the Invention

This invention relates to sheet-like wrapping materials for use in wrapping of photographic light-sensitive materials (hereinafter referred to as "light-sensitive materials") such as photographic films and printing papers, and more particularly to wrapping materials for light-sensitive materials which have desirable characteristics for such wrapping materials and can be economically produced.

2. Description of the Prior Art

Light-shielding, moisture resistant, antistatic, and heat-sealable properties are generally required for wrapping materials for use in the wrapping of light-sensitive materials as well as physical strength, and so forth. The most desirable wrapping materials are those which have such characteristics and can be economically produced.

Wrapping materials of this type which have hitherto widely been used include a composite laminate consisting of a low density polyethylene film having carbon black or other pigment incorporated therein, a paper support, an aluminum foil and a cellophane film. Typical examples of such wrapping materials are illustrated in FIGS. 1 and 2, wherein the reference numerals 1, 2, 4' and 5 designate, respectively, a paper support such as a bleached kraft paper, an adhesive layer comprising low density polyethylene and the like, a polyethylene layer containing carbon black or pigment and having light-shielding properties, and an aluminum foil.

These conventional wrapping materials, however, have not been able to completely satisfy both the physical characteristics and production cost considerations mentioned above. The wrapping material as illustrated in FIG. 1 is almost satisfactory in terms of its physical and chemical characteristics, but it is expensive because of its complicated layer structure. On the other hand, while the wrapping material as illustrated in FIG. 2 is almost satisfactory in connection with the production cost, its physical and chemical characteristics are not completely satisfactory.

Therefore, development of wrapping materials for light-sensitive materials which have the characteristics as described above and which are economical to produce has been the subject of a long and continuing search by those working in this field.

SUMMARY OF THE INVENTION

The object of this invention is to provide a novel wrapping material for light-sensitive materials which overcomes the above-described defects of the prior art wrapping materials for light-sensitive materials. Therefore according to the invention a wrapping material for light-sensitive materials is provided, including a resin layer comprising a thermoplastic resin having an aluminum paste or powder dispersed therein.

DETAILED DESCRIPTION OF THE INVENTION

According to this invention, a wrapping material for light-sensitive materials is provided which has a resin layer comprising a thermoplastic resin and aluminum paste or powder dispersed therein.

This invention will not be explained in detail with reference to the embodiments as illustrated in the accompanying drawings.

Figure 3:
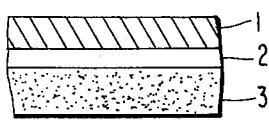
FIGS. 3 through 17 are cross-sectional views of wrapping materials according to this invention.

FIG. 3 is a sectional view of a typical embodiment of the present wrapping materials, which comprises a support 1, an adhesive layer 2, and a resin layer 3.

The support 1 is a flexible sheet of paper, plastic, cloth, cellophane or the like which has hitherto be used for wrapping materials. Although the material for use as the support is chosen depending upon various factors, such as the type and use of the product to be wrapped, paper is usually employed based on economic considerations.

In the case of the paper support, a kraft pulp paper, a sulfite pulp paper, and a mixed paper thereof, which exerts no adverse photographic influences, is preferably used. Half-bleached or unbleached paper and ordinary paper can also be used.

The support 1 may be uncolored, colored or partially colored for purposes of improving its quality and/or printing properties. Furthermore, for the purpose of improving light-shielding, antistatic or other properties, a pigment (e.g., carbon black), dye, etc. may be incorporated in the support 1.

The adhesive layer 2 is used to bond together the support 1 and the resin layer 3. Adhesive materials which can be used for the formation of the adhesive layer 2 include transparent low density polyethylene and other thermoplastic resins, hot-melt type rubber-based adhesives, solvent type rubber-based adhesives, and water-soluble adhesives. Pigments, particularly carbon black, and/or dyes can be added to the adhesive layer 2, for the same reasons as in the case of the paper support, if desired.

The resin layer 3 comprises a thermoplastic resin with an aluminum paste or powder dispersed therein.

The term "aluminum paste" as used herein refers to an aluminum powder which is produced in a paste form in the presence of white spirit (i.e., petroleum spirit or mineral spirit having a flash point of 21.11° C. or more) and a small amount of stearic acid, such as by a ball mill mixing method. By the term "aluminum powder" is meant those powders which are produced from fused aluminum by an atomizing method, a pulverizing method, a rotary disc dropping method, an evaporation method, etc., and which can be produced in a flake form through pulverization of aluminum foil. The aluminum in the forms of the aluminum paste and the aluminum powder used in this invention has particle size of about $1\mu$ to $350\mu$, preferably $3\mu$ to $100\mu$.

Thermoplastic resins which can be used in this invention include an ethylene-ethyl acrylate copolymer (EEA), low density polyethylene, high density polyethylene, polypropylene and ethylene-vinyl acetate copolymer (EVA).

The dispersion of aluminum paste or powder in the thermoplastic resin can be carried out by known procedures in which aluminum paste or powder is added to the resin, and stirred and mixed during the heat-melting process. For example, a thermoplastic resin (e.g., low density polyethylene) and an aluminum paste having an aluminum concentration of 80 wt% or more are mixed and the resulting mixture is pelletized using an extruder. The resulting pellets are pelletized again using the extruder thereby applying heating processes several times so as to decrease a white spirit content in the thermoplastic pellet to about 0.5 wt% or less. The resulting thermoplastic pellets are extruded using T-die or layflat tubing die (for inflation technique) to obtain a film.

The amount of the aluminum paste or powder being added is adjusted to from about 0.05 to 40 g $Al/m^2$, preferably form 0.1 to 20 g $Al/m^2$, considering both the characteristics desired for wrapping materials and the production cost thereof. When the amount is less than 0.05 g $Al/m^2$, light-shielding, moisture resistance and antistatic properties deteriorate, whereas when it is more than 40 g $Al/m^2$, the wrapping material obtained is inferior in physical strength, heat sealable properties, flatness (although it may have the desired characteristics) and, furthermore, the production cost thereof rises.

To the resin layer 3 are added, if desired, pigment (e.g., carbon black), dye and the like for the same reasons as in the case of the paper support.

The resin layer 3 may be a layer of a film itself produced by an inflation method (i.e., blown-film extrusion), etc. or a layer coated by an extrusion coating method, a hot melt coating method, and so forth.

The total tickness of the wrapping material, consisting of the support 1, the adhesive layer 2, and the resin layer 3 in this embodiment is usually set from about 30 to 200$\mu$, although it can vary depending upon the type and shape of the light-sensitive material to be wrapped, the form in which it is wrapped, and so forth. Generally speaking, where the physical strength is not needed, the thickness is reduced, whereas where in addition to the physical strength, light-shielding and moisture resistant properties are particularly needed, the thickness is increased. The reasons for this are as follows:

(1) The light-shielding properties increase as the amount of aluminum powder contained in the resin layer 3 is increased, and the amounts of carbon black, pigment, dye, etc. contained in the three layers.

(2) The moisture resistant properties vary depending upon the thickness of the resin layer 3 and the kind of material used in the resin layer 3; generally, moisture resistance increases as the thickness and the molecular weight of the material is increased.

(3) The antistatic properties increase as the amount of aluminum powder contained in the resin layer 3 is increased, and also as the amounts of pigment and/or dye contained therein is increased.

(4) The heat sealable properties vary depending upon the kind of the thermoplastic resin contained in the resin layer 3.

(5) The physical strength varies depending upon the thicknesses and types of the support 1 and the resin layer 3; it increases with an increase in the thickness.

As is apparent from the above explanation, the resin layer 3 containing aluminum paste or powder has the various characteristics required for wrapping materials for light-sensitive materials, and the present wrapping material having such a resin layer can be produced at a low price since the layer construction can be simplified.

Although the foregoing explanation has been made with reference to a preferred embodiment of this invention, this invention is not limited thereto and various modifications or variations can be made.

FIGS. 4 through 17 illustrate other embodiments of this invention, wherein 1 is a support, 2 is an adhesive layer, 3 is a resin layer containing aluminum paste or powder, 4 is a conventional resin layer containing no aluminum paste or powder (typically a polyethylene layer, an EEA layer, an EVA layer, etc.); and the figures with the symbol (') following the number indicates layers provided with light-shielding or antistatic properties by addition of pigment, dye, antistatic agents, and so forth.

Figure 16:
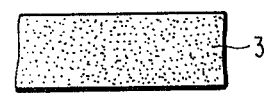
Figure 17:
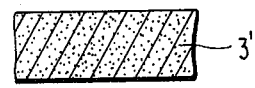

The wrapping material of this invention can be of a single layer, two layer or three layer construction, and the choice of the layer construction is made according to the type and shape of the light-sensitive material to be wrapped and the form in which it is wrapped. For example, for the wrapping of movie films, which are generally wrapped in a wrapping material, placed in a can such as a metal can, and further wrapped in thick paper, those materials consisting of the resin layer alone as illustrated in FIGS. 16 and 17 can be employed.

On the top layer of the wrapping material of this invention can be provided, as necessary, a printing layer.

The following examples are given to illustrate this invention in greater detail. In these examples, each property was measured as follows:

(1) Thickness of Wrapping Material: Measured with a micrometer according to JIS-P 8118-1976.

(2) Antistatic Property: After application of described processing steps, such as cutting and wrapping, the quantity of electric charge was measured to evaluate the antistatic property.

(3) Light-shielding Property: The extent to which a high sensitive film was fogged by light of 80,000 lux was measured to evaluate the light-shielding property.

(4) Moisture Permeability: The amount of water passed through a sample was measured with a moisture permeation cup according to JIS-Z 0208-1976 to evaluate the moisture permeability.

EXAMPLE 1

Figure 4:
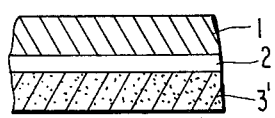
Figure 5:
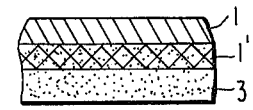
Figure 6:
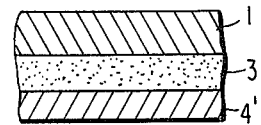
Figure 7:
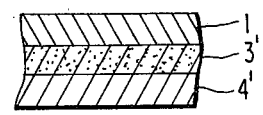
Figure 8:
Figure 9:
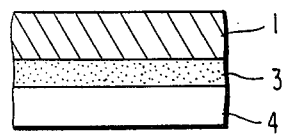
Figure 10:
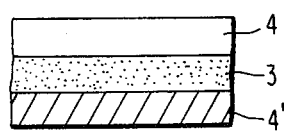
Figure 11:
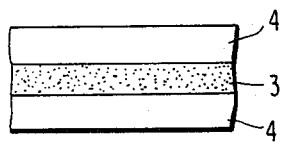
Figure 12:
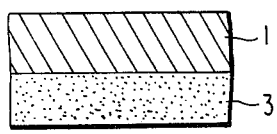

Comparison was made between a wrapping material of this invention and conventional wrapping material in suitability for wrapping material. The wrapping material of this invention as herein used had the three layer construction as illustrated in FIG. 4, wherein a support 1 was a bleached kraft paper with a basis weight of 35 g/m$^2$, an adhesive layer 2 was provided on the support 1 by extrusion-coating low density polyethylene so that the film thickness be 15$\mu$, and a resin layer 3', which had been produced from low density polyethylene with 5% by weight of aluminum paste and 3% by weight of carbon black dispersed therein by an inflation method so that the film thickness by 50$\mu$, was provided on adhesive layer 2.

Figure 1:
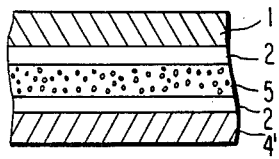
FIGS. 1 and 2 are cross-sectional views of conventional wrapping materials.
Figure 2:
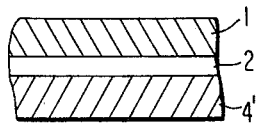

Conventional wrapping materials employed for comparison were Wrapping Materials Nos. 1 and 2, the layer constructions of which were as illustrated in FIGS. 1 and 2. In Wrapping Material No. 1, support 1 was bleached kraft paper with a basis weight of 35 g/m$^2$, adhesive layer 2 was a 15$\mu$ thick low density polyethylene film, a polyethylene layer 4' was a 50$\mu$ thick low density polyethylene film containing 3% by weight of carbon black, and an aluminum foil 5 had a thickness of 7$\mu$. In Wrapping Material No. 2, support 1 was a bleached kraft paper with a basis weight of 35 g/m$^2$, adhesive layer 2 was a 15$\mu$ thick low density polyethylene film, and polyethylene layer 4' was a 50$\mu$ thick low density polyethylene film containing 3% by weight of carbon black.

These three wrapping materials were evaluated by the testing methods as previously described, and the results are shown in Table 1. The symbol A indicates that the material is excellent, the symbol B indicates that it falls within a range that it is practically usable, and the symbol X indicates unsatisfactory properties.

These results have confirmed that the wrapping material of this invention is excellent in both of the characteristics required for wrapping materials and in production costs, as compared with conventional Wrapping Materials Nos. 1 and 2. With regard to the production costs, a decrease of 30% relative to Wrapping Material No. 1 was attained. In connection with the physical strength and heat sealable property, the results were also satisfactory.

TABLE 1

| | Wrapping Material of This Invention | Conventional Wrapping Material No. 1 | Conventional Wrapping Material No. 2 |
|---|---|---|---|
| Layer Construction | FIG. 4 | FIG. 1 | FIG. 2 |
| Total Thickness ($\mu$) | 100 | 115 | 100 |
| Antistatic Property | B | A | X |
| Moisture Permeability | 2.3 | 1.5 | 15.0 |
| Light-Shielding Property | A | A | B |
| Cost Ratio | 70 | 100 | 70 |

EXAMPLE 2

Figure 13:
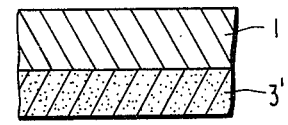
Figure 14:
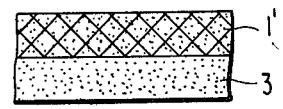
Figure 15:
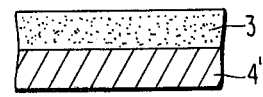

A wrapping material having the two layer construction as illustrated in FIG. 13 was produced, in which a support 1 was a bleached kraft paper with a basis weight of 35 g/m² and a resin layer 3' was produced from an ethylene-ethyl acrylate copolymer with 5% by weight of aluminum powder and 2% by weight of carbon black dispersed therein so that the layer thickness by 65$\mu$.

For comparison, the same Wrapping Material Nos. 1 and 2 as used in Example 1 were employed. In the same manner as in Example 1, the tests were conducted, and the results are shown in Table 2.

These results have confirmed that the wrapping material of this invention is excellent both in the characteristics desired for wrapping materials and in the production costs thereof. In particular, with regard to the production cost, a decrease of 40% relative to Wrapping Material No. 1 was attained. In connection with the physical strength and heat sealable properties, satisfactory results were also obtained.

TABLE 2

| | Wrapping Material of This Invention | Conventional Wrapping Material No. 1 | Conventional Wrapping Material No. 2 |
|---|---|---|---|
| Layer Construction | FIG. 13 | FIG. 1 | FIG. 2 |
| Total Thickness ($\mu$) | 100 | 115 | 100 |
| Antistatic Property | B | A | X |
| Moisture Permeability | 2.0 | 1.5 | 15.0 |
| Light-Shielding Property | A | A | B |
| Cost Ratio | 60 | 100 | 70 |

EXAMPLE 3

A wrapping material having the single layer construction as illustrated in FIG. 16 was produced, in which a resin layer 3 was a layer produced from an ethylene-vinyl acetate copolymer with 5% by weight of aluminum paste dispersed therein and having a thickness of 100$\mu$. This wrapping material was produced by an inflation method.

For comparison, the same Wrapping Material Nos. 1 and 2 as used in Example 1 were employed. In the same manner as in Example 1, the tests were conducted, and the results are shown in Table 3.

TABLE 3

| | Wrapping Material of This Invention | Conventional Wrapping Material No. 1 | Conventional Wrapping Material No. 2 |
|---|---|---|---|
| Layer Construction | FIG. 16 | FIG. 1 | FIG. 2 |
| Total Thickness ($\mu$) | 100 | 115 | 100 |
| Antistatic Property | B | A | X |
| Moisture Permeability | 1.8 | 1.5 | 15.0 |
| Light-Shielding Property | A | A | B |
| Cost Ratio | 60 | 100 | 70 |

As can be seen from the above description, this invention produces two marked effects that the present wrapping material is sufficiently satisfactory in the characteristics desired for wrapping materials, such as light-shielding, moisture resistant, antistatic and heat sealable properties, and in physical strength, and the production cost is greatly reduced in comparison with conventional wrapping materials.

While the invention has been described in detail and with reference to specific embodiments thereof, it will be apparent to one skilled in the art that various changes and modifications can be made therein without departing from the spirit and scope thereof.

What is claimed is:

1. In a wrapping material for photographic light-sensitive materials, the improvement which comprises said wrapping material including a light-shielding resin layer, said layer being produced by extruding pellets of a mixture of (1) on aluminum paste or aluminum powder and (2) a thermoplastic resin, where said pellets contain about 0.5% by weight or less of white spirit.

2. A wrapping material as in claim 1 wherein said light-shielding resin layer contains the aluminum paste or powder in an amount of from about 0.05 g Al/m² to 40 g Al/m².

3. A wrapping material as in claim 1 or 2, comprising a single layer construction.

4. A wrapping material as in claim 1 or 2, including an adhesive layer and a support.

5. A wrapping material as in claim 1 or 2, wherein said resin layer contains pigment, dye, or combinations thereof.

6. A wrapping material as in claim 5, wherein said resin layer contains carbon black.

7. A wrapping material as in claim 1 or 2 comprising a two layer construction.

8. A wrapping material as in claim 1 or 2 comprising a three layer construction.

9. A wrapping material as in claim 1 or 2 including a support and an adhesive layer between said support and said light-shielding resin layer.

10. A wrapping material as in claim 9, wherein said adhesive layer includes a thermoplastic resin, a hot-melt type rubber based adhesive, a solvent type rubber-based adhesive, or a water soluble adhesive.

11. A wrapping material as in claim 10, wherein said adhesive layer comprises transparent low density polyethylene.

12. A wrapping material as in claim 9, wherein the total thickness of the wrapping material is from about 30 to 200μ.

* * * * *